United States Patent [19]

Redfarn

[11] 4,210,725
[45] Jul. 1, 1980

[54] COMPOSITION FOR FORMING AN INTUMESCENT MATERIAL

[75] Inventor: Cyril A. Redfarn, London, England

[73] Assignee: Dixon International Limited, Pampisford, England

[21] Appl. No.: 874,513

[22] Filed: Feb. 2, 1978

[30] Foreign Application Priority Data

Feb. 4, 1977 [GB] United Kingdom ............... 04653/77

[51] Int. Cl.² ............................................... C08J 9/00
[52] U.S. Cl. ..................................... 521/100; 521/83; 521/136; 521/187; 521/907
[58] Field of Search ................... 260/2.5 FP, DIG. 24

[56] References Cited

U.S. PATENT DOCUMENTS

| | | | |
|---|---|---|---|
| 2,566,964 | 9/1951 | Scholz | 260/DIG. 24 |
| 2,684,953 | 7/1954 | Stilbert, Jr. | 260/DIG. 24 |
| 3,037,951 | 6/1962 | Basto | 260/2.5 FP |
| 4,013,599 | 3/1977 | Strauss et al. | 260/2.5 FP |
| 4,043,950 | 8/1977 | Wilmsen | 260/2.5 FP |

Primary Examiner—Morton Foelak
Attorney, Agent, or Firm—Weingarten, Maxham & Schurgin

[57] ABSTRACT

The invention provides a composition for forming an intumescent material which upon heating decomposes into gas and a solid foam residue, comprising: a water-dispersible melamine formaldehyde resin which when cured is hydrophobic; a setting agent which hardens in the presence of water thereby to cause the composition to set; a cross-linking agent for curing the resin, the cross-linking agent being a polyamido compound; an ammonium phosphate; polyvinyl acetate; a solid polyhydroxy compound; and reinforcing fibrous material. To form the intumescent material, the composition is caused to set and the melamine resin is cured. The intumescent material has improved anti-cracking properties.

14 Claims, 1 Drawing Figure

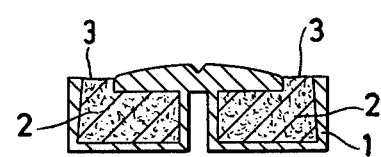

COMPOSITION FOR FORMING AN INTUMESCENT MATERIAL

The present invention relates to a composition for forming an intumescent material. The intumescent material when exposed to heat swells (i.e. intumesces) and in the intumesced state is capable of acting as a fire-resistant barrier or sealant.

Intumescent material has been used to provide a fire-resistant barrier or sealant in gaps e.g. between a door and adjacent structure, e.g. the jamb, and between a window and an adjacent structure, e.g. the window frame.

In the Complete Specification field in respect of British Patent Applications Nos. 42584/74, 9166/75 and 31219/75, there are proposed intumescent materials comprising urea formaldehyde resin constituents, the intumescent material swelling when exposed to heat and in the intumesced state being capable of acting as a fire-resistant barrier or sealant between adjacent structures. It is proposed in that Complete Specification to have the intumescent material retained in a holder for securing to one of the structures. The material may be put into the holder in the form of a paste or slurry which is allowed to set in the holder. Alternatively, instead of applying the material into the holder, the material may be applied into a gap between the structures or onto a surface of one of the structures and then allowed to set. After setting the intumescent material dries out and ages. It has been found that there was a tendency for the intumescent material to crack during setting, drying or ageing.

It is believed that the cracking is due in the main to the urea formaldehyde content of the intumescent material. The resin is hydrophilic to an appreciable extent when cured and we believe that evaporation of water temporarily held by the cured resin gave rise to the cracking.

An object of the invention is to reduce cracking of the intumescent material after application.

Accordingly, the present invention provides a composition for forming an intumescent material which upon heating decomposes into gas and a solid foam residue, comprising: a water-dispersible melamine formaldehyde resin which when cured is hydrophobic; a setting agent which hardens in the presence of water thereby to cause the composition to set; a cross-linking agent for curing the resin, the cross-linking agent being a polyamido compound; an ammonium phosphate; polyvinyl acetate; a solid polyhydroxy compound; and reinforcing fibrous material.

The invention further provides an intumescent material formed from the composition according to the invention, by curing of the melamine formaldehyde resin and hardening of the setting agent in the presence of water to cause the composition to set.

It will be appreciated that the intumescent material according to the invention need not contain (and ordinarily would not contain) any urea formaldehyde resin constituent.

The melamine resin in the composition preferably either is in powder form or is in the form of a liquid having a solids content of at least 75% by weight.

The setting agent may be calcium sulphate hemihydrate (plaster of Paris), Portland cement or high alumina cement or a mixture of such agents.

The cross-linking agent is provided in order to promote satisfactory curing of the resin and serves for cross-linking with the methylol groups on the resin molecules. The cross-linking agent may be one or more polyamido compounds such as dicyandiamide and/or guanidine. Either of these cross-linking agents will also serve to enhance the degree of intumescence of the material when exposed to heat.

The ammonium phosphate, which is preferably monoammonium phosphate, in admixture with the melamine resin serves as the main source of the intumescence of the material.

The fibrous reinforcing material may be wood flour, hammer milled glass fibres or disintegrated nylon fibres.

The solid polyhydroxy compound may be pentaerythritol or a sugar.

In general it is preferred that the amounts of the various ingredients in a composition according to the invention (and the amount of water added thereto when forming an intumescent material) vary by no more than ±10%, more preferably no more than ±5%, from the basic proportions given in the Table below.

Table

| Ingredient | Basic relative proportions |
| --- | --- |
| Melamine formaldehyde resin | 1 |
| Ammonium phosphate | 1 |
| Cross-linking agent | ½ |
| Pentaerylthritol (or other solid polyhydroxy compound) | 1/5 |
| Plaster of Paris | 1 |
| Polyvinyl acetate | 1/25 |
| Fibrous reinforcing agent | 1/20 |
| Water | ⅝ |

The composition according to the invention preferably comprises: 90 to 110 parts by weight of the water-dispersible melamine resin; 90 to 110 parts by weight of the setting agent; 45 to 55 parts by weight of the cross-linking agent; 90 to 110 parts by weight of the ammonium phosphate; 3.6 to 4.4 parts by weight of the polyvinyl acetate; 18 to 22 parts by weight of the solid polyhydroxy compound and 4.5 to 5.5 parts by weight of the reinforcing fibrous material; these parts by weight being based on a total of 250 parts by weight of the melamine resin, the setting agent and the cross-linking agent.

The preferred composition described above is preferably admixed with 56 to 69 parts by weight of water per 100 parts by weight of the melamine resin in preparing the intumescent material according to the invention.

The intumescent material according to the invention preferably comprises: 90 to 110 parts by weight of the melamine resin; the resin including cross-linking residues being derived from 45 to 55 parts by weight of the polyamido compound: 90 to 110 parts by weight of the setting agent; 90 to 110 parts by weight of the ammonium phosphate; 3.6 to 4.4 parts by weight of the polyvinyl acetate; 18 to 22 parts by weight of the solid polyhydroxy compound; 4.5 to 5.5 parts by weight of the reinforcing fibrous material; and 56 to 69 parts by weight of water; these parts by weight being based on a total of 250 parts by weight of the melamine resin and the setting agent.

The invention is illustrated by the following examples.

EXAMPLE 1

The following composition is made as a dry powder suitable for stocking by intermixing the following constituents in a dry powder state:

| | |
|---|---|
| Melamine formaldehyde resin powder | 3800 g |
| Monoammonium phosphate | 4200 g |
| Dicyandiamide | 2000 g |
| Pentaerythritol | 800 g |
| Plaster of Paris | 1100 g |
| Water dispersible polyvinyl acetate powder | 150 g |
| Wood flour (passing through 90 mesh) | 25 g |

The plaster of Paris is of the kind which exhibits high expansion during setting.

Water (2400 g) is intermixed with the above dry composition immediately before it is to be put into a holder strip. The mixture thus formed is a slurry which can be pumped into the holder if tubular. The holder is loaded quickly with the slurry because of the setting action of the plaster of Paris which begins as soon as the water has been added. In tests carried out up to the present, the slurry mixture is allowed to stand in the holder for 2 days at room temperature, the holder if tubular thereafter being slotted along one face by a milling cutter to expose the mixture, which is thereafter matured at 40° C. for 24 hours. The holder containing the mixture is then ready for application as a fire-resistant seal.

A water absorption test carried out on the matured mixture showed it to increase in weight by about 7% after a 24 hour immersion. It is therefore advisable to waterproof the mixture as soon as the standing and maturing periods are complete in order to improve the shelf and service life of the fire-resistant seal produced. Waterproofing can be effected by coating the matured mixture or material in the holder with polyurethane resin.

The intumescent material with the composition set out above and as a layer of 8 mm wide×4 mm thick and 1 meter long exhibited no cracking when examined 1 year after being put in the holder to mature.

The holder is preferably of metal of high thermal conductivity such as aluminium, but may be of rigid plastics such as rigid PVC or ABS.

To make a wet mix ready for immediate intermixing with additional water to form a paste or slurry for immediate loading into a holder, the polyvinylacetate powder in the foregoing composition may be replaced by 300 g of a vinyl resin emulsion (50% solids).

The foregoing composition can be adapted to the production of a plaster of Paris mix, for application, when made into a paste, to gaps round the jambs and lintel of a door and to surface areas generally, where intumescence under conflagration conditions is advantageous. To this end ordinary plaster of Paris as used by builders is used in the composition, and the proportion of plaster of Paris is as high as is consistent with an acceptable degree of intumescence. This modification of the invention is illustrated by Example 2 below.

EXAMPLE 2

A first mix is prepared consisting of:

| | |
|---|---|
| Plaster of Paris | 4800 g |
| Dicyandiamide | 2000 g |
| Pentaerythritol | 800 g |
| Water-dispersible polyvinyl acetate powder | 150 g |
| Wood flour (passing through 90 mesh) | 250 g |

A second mix is prepared consisting of:-

| | |
|---|---|
| Monoammonium phosphate | 4200 g |
| Melamine formaldehyde resin powder | 3800 g |

Equal parts by weight of the first and second mixes are admixed together and water is added to make a trowellable paste which can be applied to surface areas generally and becomes an intumescent material.

An example of a suitable holder is shown in the accompanying drawing which is a cross-sectional view of the holder.

The holder shown in the drawing is in the form of a strip 1 of uniform cross-section defining two grooves each loaded with intumescent material 2. The holder 1 has slots 3 forming the mouths of the grooves.

A fire test was carried out using a sealing device consisting of the holder shown in the drawing containing intumescent material prepared and loaded into the holder as described in the Example 1 above. The holder was formed of aluminium. The test is described below.

The fire test was primarily a test for fire resistance on a wooden door according to British Standard 476; Part 8; 1972, Item 7. The door consisted of chipboard faced with plywood covered by PVC (polyvinyl chloride). The door was a two part swing door intended for hospital use. The door was located in a doorway, the top edge and the side edges of the doorway being fitted with fire barrier material. At the meeting stile down the middle of the two parts of the door, the sealing device according to the invention, was fitted, the sealing device being located in a groove in one of the door parts with its slots facing the other door part.

A combustion chamber behind the door contained gas jets directed across the inside door face. The jets were lit and the temperature rose to about 800° C. in 30 minutes and was held at about 850° C. for a further 30 minutes.

After 10 to 15 minutes from the start up there was a heat surge and the recorded temperature rose to about 950° C. This was ascribed to the exothermic reaction as the inside PVC facing on the door was combusted. At the end of the test run, that is 60 minutes from starting up the outside of the door and the seal in the stile was intact. Thus the intumescent material had complied with the test requirements.

The heating was continued for another 10 minutes to see whether any breakdown would take place. At 3–5 minutes of extra time the door itself started to buckle at the bottom of the meeting stile, some smoke started to seep out at that place.

Thus, the sealing device, according to the invention started to fail only after the door itself had failed.

Sealing devices as described above were also subjected to accelerated ageing tests to determine the thickness of intumesced material known as "puff" formed after various amounts of accelerated ageing.

The results of the tests were as follows:

| | |
|---|---|
| before ageing | 20 mm puff |
| after ageing equated with one year | 19 mm puff |

| after ageing equated with five years | 25 mm puff |
| after ageing equated with eight years | 23 mm puff. |

The thickness of the puff was measured in the direction normal to the width of the slots in the holders.

I claim:

1. A composition for forming an intumescent material which upon heating decomposes into gas and a solid foam residue, comprising:
    a water-dispersible melamine formaldehyde prepolymer resin which when cured is hydrophobic;
    an inorganic hydrophillic setting agent which chemically absorbs water and hardens quickly causing the composition to set;
    a cross-linking agent present in an amount to cure the melamine formaldehyde prepolymer resin, the cross-linking agent being selected from the group consisting of dicyandiamide and guanidine;
    an ammonium phosphate;
    polyvinyl acetate;
    a solid polyhydroxy compound; and
    reinforcing fibrous material.

2. A composition according to claim 1, wherein the water-dispersible melamine formaldehyde resin has a solids content of at least 75% by weight.

3. A composition according to claim 1, wherein the ammonium phosphate is monoammonium phosphate.

4. A composition according to claim 1, wherein the cross-linking agent comprises at least one of dicyandiamide and guanidine.

5. A composition according to claim 1, in the form of a dry powder.

6. A composition according to claim 1, comprising: 90 to 110 parts by weight of the water-dispersible melamine resin; 90 to 110 parts by weight of the setting agent; 45 to 55 parts by weight of the cross-linking agent; 90 to 110 parts by weight of the ammonium phosphate; 3.6 to 4.4 parts by weight of the polyvinyl acetate; 18 to 22 parts by weight of the solid polyhydroxy compound and 4.5 to 5.5 parts by weight of the reinforcing fibrous material; these parts by weight being based on a total of 250 parts by weight of the melamine resin, the setting agent and the cross-linking agent.

7. A composition according to claim 1 wherein the inorganic hydrophillic setting agent is selected from the group consisting of plaster of Paris, Portland cement and high alumina cement.

8. A composition for forming an intumescent material which upon heating decomposes into gas and a solid foam residue, comprising:
    a water-dispersible melamine formaldehyde prepolymer resin which when cured is hydrophobic;
    calcium sulphate hemihydrate as a setting agent which chemically absorbs water and hardens quickly causing the composition to set;
    dicyandiamide as a cross-linking agent for curing the resin, the dicyandiamide being present in an amount sufficient to cure the melamine formaldehyde resin;
    ammonium phosphate;
    polyvinyl acetate;
    a solid polyhydroxy compound; and
    reinforcing fibrous material.

9. A composition for forming an intumescent material which upon heating decomposes into gas and a solid foam residue, comprising:
    a water-dispersible melamine formaldehyde prepolymer resin which when cured is hydrophobic;
    calcium sulphate hemihydrate as a setting agent which chemically absorbs water and hardens quickly, causing the composition to set;
    guanidine as a cross-linking agent for curing the prepolymer resin, the guanidine being present in an amount sufficient to cure the melamine formaldehyde prepolymer resin;
    ammonium phosphate;
    polyvinyl acetate;
    a solid polyhydroxy compound; and
    reinforcing fibrous material.

10. A composition according to claim 8 or 9 wherein the water-dispersible melamine formaldehyde resin has a solid content of at least 75% by weight.

11. A composition according to claim 8 or 9 wherein the ammonium phosphate is monoammonium phosphate.

12. A composition according to claim 8 or 9 wherein the solid polyhydroxy compound is pentaerythritol.

13. A composition according to claim 8 or 9 wherein the reinforcing fibrous material is wood flour.

14. A composition according to claim 8 or 9 comprising:
    90–110 parts by weight of the water-dispersible melamine resin;
    90–110 parts by weight of the calcium sulphate hemihydrate;
    45–55 parts by weight of the cross-linking agent;
    90–110 parts by weight of the ammonium phosphate;
    3.6–4.4 parts by weight of the polyvinyl acetate;
    18–22 parts by weight of the solid polyhydroxy compound; and
    4.5–5.5 parts by weight of the reinforcing fibrous material; these parts by weight being based on a total of 250 parts by weight of the melamine resin, the calcium sulphate hemihydrate and the cross-linking agent.

* * * * *